J. R. ADAMS.
Pillow Sham Frame and Holder.
No. 9,621. Reissued March 29, 1881.
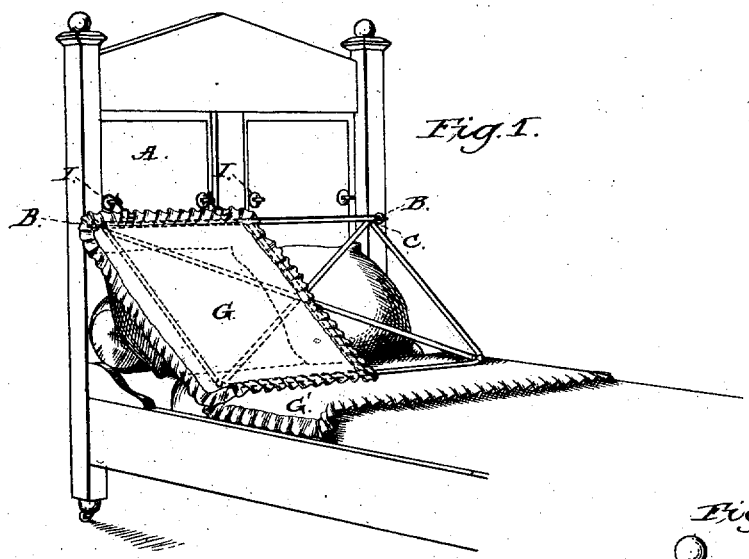
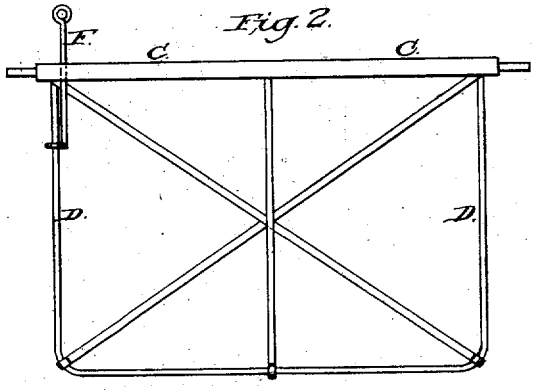
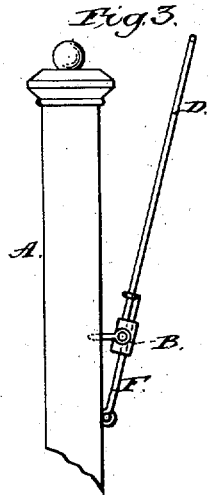
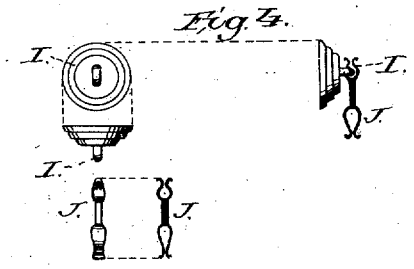
WITNESSES
Villette Anderson.
John A. Ellis.
INVENTOR
John R. Adams,
by Anderson & Smith
his ATTORNEYS
N. PETERS, PHOTO-LITHOGRAPHER, WASHINGTON, D. C.

UNITED STATES PATENT OFFICE.

JOHN R. ADAMS, OF OAKLAND, CALIFORNIA.

PILLOW-SHAM FRAME AND HOLDER.

SPECIFICATION forming part of Reissued Letters Patent No. 9,621, dated March 29, 1881.

Original No. 214,800, dated April 29, 1879. Application for reissue filed January 15, 1881.

*To all whom it may concern:*

Be it known that I, JOHN R. ADAMS, of Oakland, in the county of Alameda and State of California, have invented certain new and useful Improvements in Pillow-Sham Frames and Holders; and I do hereby declare the following is a full, clear, and exact description of the invention, that will enable others skilled in the art to which it appertains to make and use the same, reference being had to the accompanying drawings, and to the letters of reference marked thereon, which form a part of this specification.

This invention relates to frames for the support of pillow-shams and sheet-shams. Its object is the construction of a device which will hold the shams smooth, free from wrinkles, and which can be readily thrown out of the way when the bed is to be used, without disturbing or disarranging the shams.

To this end the invention consists in a frame arranged and constructed as hereinafter described.

In the annexed drawings, Figure 1 is a perspective view of the device applied. Fig. 2 is a plan view. Fig. 3 is an end view of the frame raised. Fig. 4 is a detail view of the catches.

A is the head-board of a bedstead. B B are two eyes or staples secured therein.

C is a bar with ends rounded, or provided with pintles to fit and work in the eyes, that serve as hinges or pivots on which the bar can be turned.

D is a frame made of wire, and united to the bar C, so that the two parts together form a rectangular frame. Suitable cross bars or braces are added, if required, to form a support in the center.

F is a sliding rod or catch that comes into play to hold the frame back when it is turned up.

I I are small eyes, rings, or staples, that are fixed in ornamental escutcheons or rosettes, and by this means are fastened to the head-board of the bedstead without disfiguring it, and J J are double spring clips or clamps that engage with these eyes and with the upper edge and corners of the pillow-shams. These rings or eyes and their clips are designed to hold the shams in place upon the slanting support, and to keep them from slipping down or being drawn out of place, and by their use no pins or other fastenings are required. There is consequently no liability of the shams being torn or disfigured by a frequent fastening, and they are not wrinkled or soiled.

G are the pillow-shams, and G′ the sheet-shams.

The frame C D occupies in the day-time a position more or less slanting, as shown in Fig. 1, and when turned up at night it is held back by the catch F.

The ornamental rosettes, with their eyes I, can be readily and permanently secured to the head-board without detracting from the appearance of the bedstead; and the clips J J are fastened both to the eyes and to the edges of the pillow-shams without difficulty and without danger of tearing the shams, as the spring-jaws will slip if too strong a pull is given upon the shams through carelessness.

What I claim is—

1. In combination with the head-board of a bedstead, a frame pivoted thereto for supporting pillow-shams in an inclined position, and adapted to be turned up and supported in an elevated position, substantially as set forth.

2. The pillow-sham frame C D, with pintles or pivots, and a catch or holding device to support it when turned up, as described, in combination with the staples B B, secured to the head-board of a bedstead, to operate as and for the purpose set forth.

In testimony whereof I affix my signature in presence of two witnesses.

JOHN R. ADAMS.

Witnesses:
WILLIAM REED,
D. L. EMERSON.